United States Patent Office 3,664,581
Patented May 23, 1972

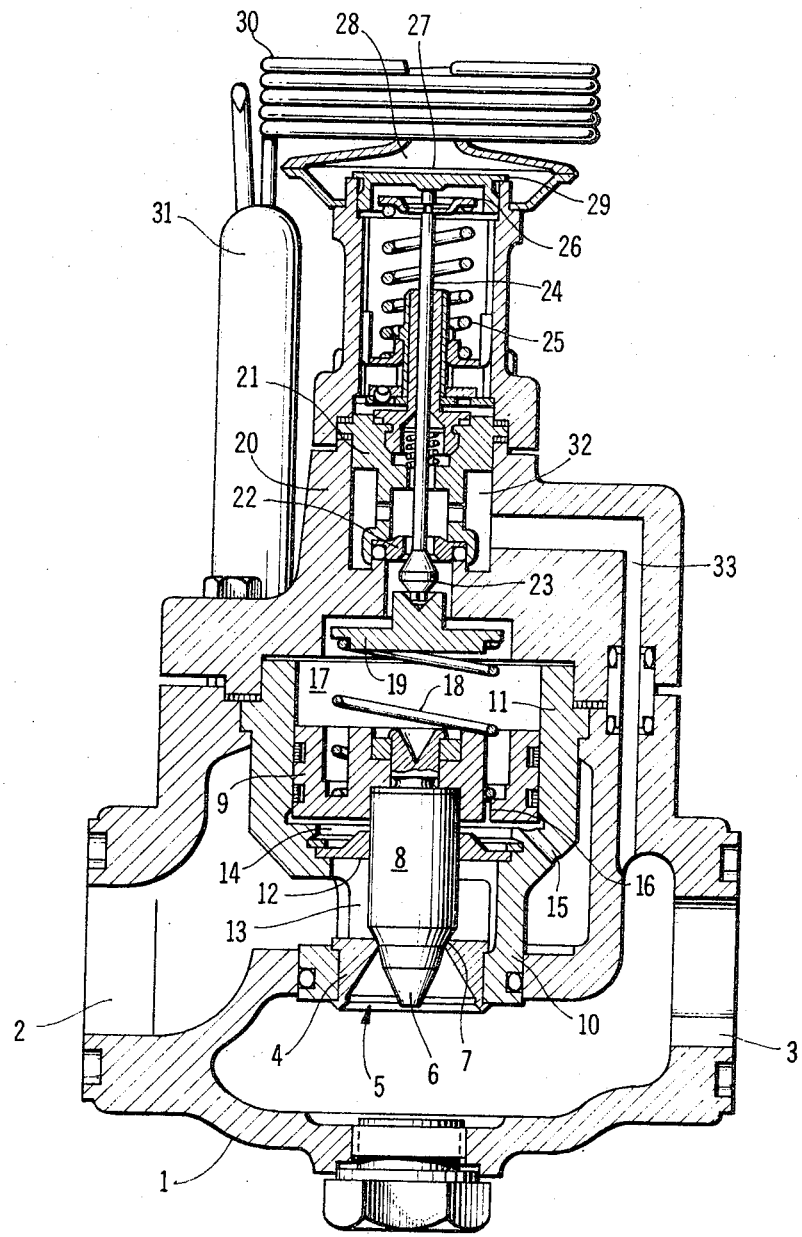

3,664,581
THERMOSTATICALLY CONTROLLED EXPANSION
VALVE FOR REFRIGERATING EQUIPMENT
Jorgen Christian Stannow, Sonderborg, Denmark,
assignor to Danfoss A/S, Nordborg, Denmark
Continuation of application Ser. No. 821,816, May 5,
1969. This application Feb. 9, 1971, Ser. No. 114,041
Int. Cl. F25b 41/04
U.S. Cl. 236—80                                     6 Claims

ABSTRACT OF THE DISCLOSURE

The invention relates to a thermostatically controlled valve assembly for high capacity refrigeration equipment. The valving includes main and auxiliary valves with the auxiliary valve functioning as a pilot valve. In the operation the main valve may occupy any intermediate position between fully opened and fully closed positions.

---

This application is a continuation of application number 821,816 filed May 5, 1969, and now abandoned.

The invention relates to a thermostatically controlled expansion valve for refrigerating equipment.

The closure member of such an expansion valve must be capable of occupying any intermediate position between the fully opened and the fully closed positions. The normal expansion valves fulfill this requirement completely satisfactorily where the closure member is directly displaced by the thermostatic operating element against the force of a spring rated for a nominal value. The thermostatic operating element may also communicate directly with the vapour compartment of the refrigerant system. Such a valve is not however adequate in larger cooling systems, since the quantity of material that a thermostatically controlled valve of this kind is able to pass through is limited.

A valve arrangement is therefore known wherein the usual thermostatically controlled expansion valve is simply an auxiliary valve, which is connected to the main valve through a pipe. The auxiliary valve controls the flow by means of a throttle, the pressure-drop at which displaces a piston, actuating the main valve, thereby overcoming the resistance of a counter-pressure spring supported on the housing. Impacts or vibrations have frequently occurred with this known arrangement however. Also, the closure member of the main valve has not always followed the control movement of the auxiliary valve in the desired manner, but has tended to move into the fully open and closed positions.

Also known is a suction-pressure regulator for refrigerating systems, which again consists of an auxiliary valve and a main valve connected thereto through a pipe. The closure member of the main valve closes in the direction of flow and is connected through a spindle to a piston which has a considerably larger cross-section than the closure member and, on that side remote from the closure member, is loaded by a counter-pressure spring supported on the housing. Again, the piston is subjected to the effect of a pressure differential occurring at a throttle, the flow through which is controlled by the auxiliary valve. This suction-pressure regulator is only intended to allow refrigerant in vapour form to pass through. The main valve can largely occupy only a completely open or a completely closed position.

A valve arrangement for a water pipe is known wherein a thermostatically controlled auxiliary valve and a main valve controlled thereby are combined to form a single unit. Again, the auxiliary valve controls the flow through a throttle. The pressure-drop at the throttle controls a cylinder which forms the closure member of the main valve and closes in a direction opposite to that of flow. Its counter-pressure spring is not supported on the housing but on the spindle of the auxiliary valve. The latter provides a return, which enable good proportionality to be obtained between the position of the auxiliary valve and that of the main valve.

The object of the invention is to provide a thermostatically controlled expansion valve which is suitable for large refrigerating systems, operates in a reliable manner and possesses good working characteristics.

According to the invention this object is achieved by the combination of the following features known per se:

(a) A thermostatically actuated auxiliary valve controls the flow through a throttle, the pressure-drop at which displaces a piston, actuating a main valve, against the resistance of a counter-pressure spring.

(b) The auxiliary valve and the main valve are combined to form a single unit, and the counter-pressure spring is supported on the spindle of the auxiliary valve and acts against the force of the thermostatic operating element.

(c) The closure member of the main valve closes in the direction of flow and is connected by way of a spindle to the piston contained in the cylinder, which piston has a considerably larger cross-section than the closure member and is loaded by the counter-pressure spring on that side remote from the closure member.

This combination solves the problems arising from the fact that although the refrigerant is present in the liquid condition, it may nevertheless in certain circumstances change to the vapour state. If, however, vaporization takes place before the expansion valve is reached, the valve arrangement may no longer operate properly. Due to the large cross-section of the piston, related to the cross-section of the closure member of the main valve, an adequate stroke can be obtained with a small pressure-drop at the throttle. This pressure-drop can consequently be kept so small that it does not lead to the formation of vapour. Furthermore, the auxiliary valve is combined with the main valve to form a single unit, so that heating up and therefore vaporization of the refrigerant flowing to the auxiliary valve cannot occur in an intermediate pipe. In an extreme case the seat of the auxiliary valve can even be located in the space above the piston. If, however, provision is made in this way for liquid refrigerant to be present as far as the auxiliary valve, use can also be made of a valve construction that has given good service in water piping. As the closure member of the main valve closes in the direction of flow, account is taken of the forces which the refrigerant applies to the closure member as it flows through while undergoing a considerable drop in pressure.

The spindle preferably passes through a base sealing the cylinder and the spaces on both sides thereof are connected by way of a throttle passage. This arrangement results in a hydraulic damping effect, since, during the closing action, the piston must displace, through the throttle passage, liquid that is present between the piston and the base.

Furthermore, the throttle means producing the pressure-drop at the piston should have a greater throttling resistance than that of the throttle passage. This ensures that, despite the required damping effect the drop in pressure in the refrigerant flowing to the auxiliarly valve is negligibly small in the throttle passage.

In a preferred embodiment the closure mmeber has a needle-like flow element and, adjacently thereto, a sealing peripheral edge, which at the same time acts as a stop for the movement of the piston. The flow element can be so designed that a predetermined flow cross-section is uncovered in dependence upon the stroke. Additionally, the spindle can form a single piece with the valve member and can have the same diameter as the greatest diameter of the valve member.

The invention will now be described in more detail by reference to an embodiment illustrated in the drawing. The drawing shows a longitudinal section through an expansion valve in accordance with the invention.

Contained in a housing 1 having a supply port 2 and an outlet port 3 is a seat 4 for a main valve. This comprises a closure member 5 having a needle-like flow element 6 and a sealing peripheral edge 7, which forms an end stop. The closure member 5 is connected to a piston 9 by way of a spindle 8 the diameter of which is equal to the greatest diameter of the closure member 5. The piston has a cross-section which is a multiple of that of the closure member 5, particularly in the zone of the sealing edge 7. The valve seat is retained in an insert 10, which, at its upper end, forms a cylinder 11, in which the piston 9 is axially displaceable. The spindle 8 passes through a base 12 which separates the space 13 above the valve seat 4 from the space 14 below the piston 9. A throttle passage 15 in the insert 10 connects the spaces 13 and 14. A throttle 16 in the piston 9 connects the space 14 to the space 17 above the piston 9. Furthermore, the piston is biased by a counter-pressure spring 18, backed by a plate 19.

Between a cap element 20 and an insert 21 there is secured a valve seat 22 for an auxiliary valve which cooperates with a closure member 23. The valve spindle 24 of this auxiliary valve is urged upwards by a spring 25, rated at a nominal value, which acts upon a plate 26, while the diaphragm 27 of a thermostatic operating element 28 acts upon the spindle 24 in the opposite direction, by way of a plate 29. The operating element is connected through a capillary tube 30 to a sensor 31 which is fitted on the vaporizer. It contains a liquid-vapour filling. The lower end of the spindle 24 acts upon the plate 19. A passage 33 leads from a space 32 above the seat 20 of the auxiliary valve to the outlet port 3.

In operation, liquid refrigerant is present in the inlet port 2. When the auxiliary and main valves are closed, it can pass as far as the space 17 through the space 13, the throttle passage 15, the space 14 and the thottle passage 16. If the auxiliary valve now opens as a result of the thermostatic control, refrigerant flows away through the auxiliary valve so that it can expand. Consequently a pressure-drop occurs at the throttle 16. This pressure-drop provides for upward movement of the piston 9. Consequently the main valve opens and part of the refrigerant approximately proportional to the part flowing through the auxiliary valve also flows away through the main valve. Since, because of the upward movement of the piston 9, the counter-pressure spring 18 influences the closure member 23 of the auxiliary valve, a return occurs which ensures a closely linked movement between the closure member of the auxiliary valve and the closure member of the main valve. When the auxiliary valve closes again, so that the piston is no longer acted upon by differential pressure, the piston moves downwards again, the refrigerant flowing through the main valve applying considerable force to the closure member in the direction for closing. During this closing movement, liquid refrigerant is forced out of the space 14 and through the throttle 16 into the space 17 and through the throttle passage 15 into the space 13. This damps down the closing movement.

As already mentioned, the thermostatic operating element 28 can also be directly connected to a part of the refrigerating system carrying a refrigerant vapour. A further favorable feature of this arrangement is that leaking liquid that seeps along the outer surface of the piston must flow away through the auixilary valve so that losses due to leakage do not interfere with operations.

What is claimed is:

1. A thermostatically controled expansion valve assembly for refrigerating systems comprising, a casing inlet and outlet passages in said casing, a main valve port between said passages, a main valve for said main valve port, said casing defining a main chamber above said main valve, a piston in said main chamber connected to said main valve, said piston dividing said chamber into upstream and downstream compartments, said piston having an effective area substantially larger than the effective area of said main valve port, said casing defining an auxiliary chamber and an auxiliary valve port between said chambers, an auxiliary valve for said auxiliary port for controlling the egress of pressurized fluid from said downstream compartment of said main chamber, first fluid passage means in said casing between said auxiliary chamber and said outlet passage, second fluid passage means in said casing between said inlet passage and said upstream compartment of said main chamber for admitting pressurized fluid to said upstream compartment, a main spring between said piston and said auxiliary valve for biasing both of said valves in closing directions, fluid passage means in said piston connecting opposite ends of said chamber, a diaphragm and a diaphragm chamber in said casing, rod means connecting said diaphragm and said auxiliary valve, and an auxiliary spring between said auxiliary valve and said diaphragm biasing said auxiliary valve in a closing direction and tending to reduce the volume of said diaphragm chamber.

2. A thermostatically controlled expansion valve assembly according to claim 1 wherein said casing defines a bore between said inlet passage and said main chamber, a spindle connecting said main valve and said piston and being disposed in said bore in slidable and sealable relation thereto, said casing defining second fluid passage means between said main chamber and said inlet passage.

3. A thermostatically controlled expansion valve assembly according to claim 2 wherein said fluid passage means in said piston has greater throttle resistance than said second fluid passage means.

4. A thermostatically controlled expansion valve assembly according to claim 1 wherein said auxiliary chamber and said auxiliary valve port are disposed above said main chamber.

5. A thermostatically controlled expansion valve assembly according to claim 1 wherein said main valve and said main valve port comprise a needle type expansion valve, said main valve having a sealing peripheral edge which acts as a stop for said piston.

6. A thermostatically controlled expansion valve assembly according to claim 2 wherein said main valve and said spindle are integrated as a single element, said spindle having a larger diameter than the diameter of said main valve port.

References Cited
UNITED STATES PATENTS

| | | | |
|---|---|---|---|
| 2,613,689 | 10/1952 | Clausen et al. | 251—44 |
| 2,593,564 | 4/1952 | Ives | 236—80 |

WILLIAM E. WAYNER, Primary Examiner

U.S. Cl. X.R.

62—222; 236—92 B; 251—44